United States Patent [19]

Groll

[11] 4,246,174
[45] Jan. 20, 1981

[54] PROCESS FOR THE PREPARATION OF PHTHALOCYANINE REACTIVE DYESTUFFS

[75] Inventor: Manfred Groll, Cologne, Fed. Rep. of Germany

[73] Assignee: Bayer Aktiengesellschaft, Leverkusen, Fed. Rep. of Germany

[21] Appl. No.: 97,576

[22] Filed: Nov. 26, 1979

[30] Foreign Application Priority Data

Dec. 13, 1978 [DE] Fed. Rep. of Germany ....... 2853823

[51] Int. Cl.³ ............................................ C09B 47/04
[52] U.S. Cl. .................................... 260/242.2; 8/661; 260/314.5; 544/181; 544/194
[58] Field of Search .......................... 260/242.2, 314.5; 544/181, 194

[56] References Cited

U.S. PATENT DOCUMENTS

| | | | |
|---|---|---|---|
| 2,288,478 | 6/1942 | Nadler et al. | 260/314.5 |
| 3,660,386 | 5/1972 | Benz et al. | 260/242 |
| 3,711,508 | 1/1973 | Groll | 260/314.5 |
| 3,989,692 | 11/1976 | Jager et al. | 260/242 |
| 4,052,386 | 10/1977 | Bein et al. | 260/242.2 |
| 4,115,378 | 9/1978 | Bien et al. | 544/194 |

FOREIGN PATENT DOCUMENTS 868483 12/1978 Belgium.
1208553 10/1970 United Kingdom.
1526840 10/1978 United Kingdom.

*Primary Examiner*—A. Lionel Clingman
*Attorney, Agent, or Firm*—Sprung, Felfe, Horn, Lynch & Kramer

[57] ABSTRACT

Phthalocyanine dyestuffs of the formula

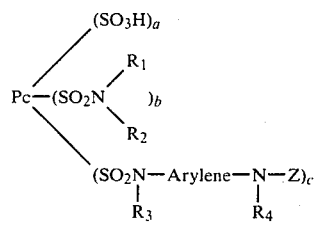

wherein

Pc denotes the radical of a copper phthalocyanine or nickel phthalocyanine,
$R_1$, $R_2$, $R_3$ and $R_4$ denote hydrogen or alkyl,
Z denotes

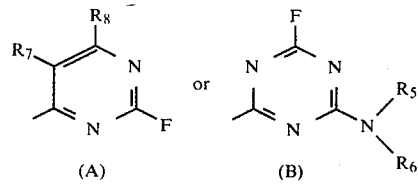

wherein
$R_5$ and $R_6$ denote H or a hydrocarbon radical,
$R_7$ denotes H or Cl and
$R_8$ denotes H, F or $CH_3$, and
a denotes a number from 1 to 3,
b denotes a number from 0 to 2,
c denotes a number from 1 to 2 and
$a+b+c \leq 4$, are obtained in a particularly advantageous manner when compounds of the formula

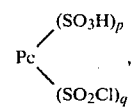

wherein
p denotes a number from 0.5 to 1.8,
q denotes a number from 1.2 to 3.5 and
$p+q = 2$ to 4, are reacted with c mols of a compound of the formula

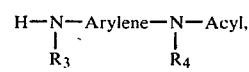

and, if appropriate, b mols of an amine of the formula

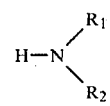

the acylamino group is split off and the resulting phthalocyanine dyestuff is reacted with c mols of a compound from which the radical of the formula A or B is derived.

8 Claims, No Drawings

PROCESS FOR THE PREPARATION OF PHTHALOCYANINE REACTIVE DYESTUFFS

It has now been found that phthalocyanine reactive dyestuffs of the formula

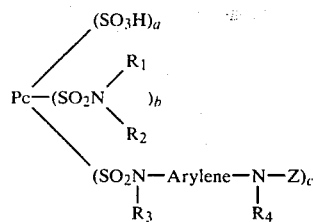

wherein
- Pc denotes the radical of a copper phthalocyanine or nickel phthalocyanine,
- $R_1$ and $R_2$ denote hydrogen or optionally substituted alkyl,
- $R_3$ and $R_4$ denote hydrogen or optionally substituted alkyl,
- Arylene denotes a single-membered or multi-membered, optionally substituted arylene radical which can optionally be interrupted by an oxygen atom or an imino, carbonyl, carboxamide, urea, sulphonyl or sulphonamide group,
- Z denotes

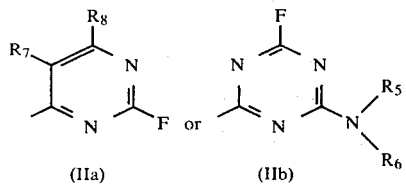

wherein
- $R_5$ and $R_6$ denote hydrogen, optionally substituted alkyl, optionally substituted aralkyl or optionally substituted aryl,
- $R_7$ denotes H or Cl and
- $R_8$ denotes H, F or $CH_3$ and
- a denotes a number from 1 to 3,
- b denotes a number from 0 to 2,
- c denotes a number from 1 to 2 and
- $a+b+c \leq 4$, are obtained in a particularly advantageous manner when phthalocyanine-(sulphonic acid chloride)-sulphonic acids of the formula

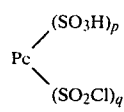

wherein
- p denotes a number from 0.5 to 1.8 (preferably 0.8 to 1.4 or, if b=0, 1.0 to 1.6),
- q denotes a number from 1.2 to 3.5 and
- p+q=2 to 4, are reacted with c mols of a monoacylated arylenediamine of the formula

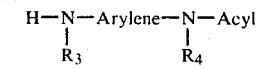

wherein
- $R_3$, $R_4$ and Arylene have the abovementioned meaning and
- Acyl represents an acyl group, and, if appropriate, b mols of an amine of the formula

wherein $R_1$ and $R_2$ have the abovementioned meaning, the acylamino group is subsequently saponified and the product is then reacted with c mols of a compound of the formula

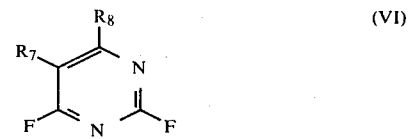

or with c mols of a compound of the formula

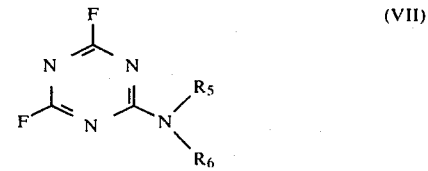

wherein $R_5$–$R_8$ have the abovementioned meaning.

The reaction of phthalocyanine-(sulphonic acid chloride)-sulphonic acids of the formula (III) with monoacylated diamines of the formula (IV) and, if appropriate, the reaction of the products with amines of the formula (V) are carried out in a known manner in an aqueous or aqueous/organic medium at temperatures from 0° to 80° C. and in a pH range of 4 to 12.

Examples of suitable monoacylated diamines of the formula (IV) are 2-aminoformanilide, 3-aminoacetanilide, 3-aminophenyloxamic acid, 4-aminoformanilide, 4-aminoacetanile, 2-aminoacetanilide, 4-amino-(acetylmethyl)-aniline, 4-aminophenyloxamic acid, 2,5-dichloro-4-aminoacetanilide, 4-amino-2-formylaminotoluene, 4-amino-2-acetylaminotoluene, 2-amino-4-acetylaminotoluene, 2-amino-4-(acetylethylamino)-toluene, [(3-amino-4-methylphenyl)-amino]-oxoacetic acid, (4'-amino-4-diphenylyl)-oxamic acid, 2-amino-4-acetylaminobenzoic acid, 2-amino-5-acetylaminobenzoic acid, 3-amino-5-acetylaminobenzoic acid, 4-amino-4'-acetylaminodiphenyl-2-sulphonic acid, 2-sulpho-4-aminophenyl-oxamic acid and (5-sulpho-3-amino-2-methylphenyl)-oxamic acid.

Within this group, monoacylated diamines of the formula (IV) which are particularly suitable are those in which Arylene represents a phenylene radical which is optionally substituted by methyl or ethyl groups or by halogen atoms, such as, for example, 3-aminoformanilide, 3-aminoacetanilide, 3-aminophenyloxamic acid, 4-aminoformanilide, 4-aminophenyloxamic acid, 2,5- dichloro-4-aminoacetanilide, 4-amino-(acetylmethylaniline), 4-amino-2-formylaminotoluene and 2-amino-4-acetylaminotoluene.

Suitable compounds of the formula (VI) are 2,4,6-trifluoro-5-chloro-pyrimidine, 2,4-difluoro-5-chloro-6-methyl-pyrimidine, 2,4,6-trifluoropyrimidine and 2,4-difluoro-5-chloro-1,3-pyrimidine.

A large number of suitable compounds of the formula (VII) are described in the literature. Compounds in which the radical —$NR_5R_6$ represents the grouping

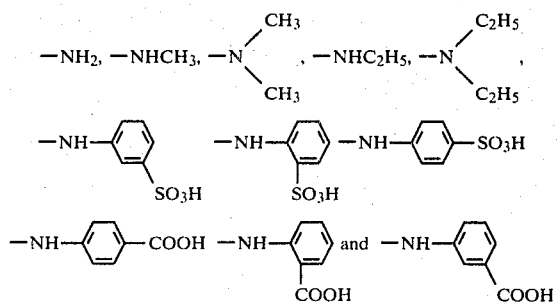

are particularly preferred in this context.

The phthalocyanine-(sulphonic acid chloride)-sulphonic acids are prepared in a known manner by treating copper phthalocyanine or nickel phthalocyanine or sulphonic acids thereof with chlorosulphonic acid at 100° to 145°, temperatures of between 110° to 138° C. being preferred. The proportions of sulphochloride groups and sulphonic acid groups can be varied relative to one another by varying the amount of chlorosulphonic acid. In addition, the ratio of p to q can be varied by after-treatment of the chlorosulphonic acid melt with a suitable amount of thionyl chloride, phosphorus oxychloride or phosphorus pentachloride, preferably at temperatures between 70° and 95° C.

The dyestuffs obtained by the process according to the invention are suitable for dyeing and printing cellulose. Those dyestuffs which contain no sulpho or carboxyl group in the arylene radical are particularly suitable for dyeing from a long liquor and for pad-dyeing.

EXAMPLE 1

(a) 57.2 g of nickel phthalocyanine are stirred into 310 g of chlorosulphonic acid. The temperature is increased to 132° C. and the mixture is stirred at 132°-134° C. for 6 hours and cooled to 85° C. and 19 g of thionyl chloride are stirred in at this temperature in the course of ⅓ hour. Thereafter, stirring is continued at 90°-92° C. for a further 4 hours and the melt is cooled to 25°-30° C. A solution of nickel phthalocyanine-(sulphonic acid chloride)-sulphonic acid, containing about 1.4 sulphonic acid groups and 2.6 sulphonic acid chloride groups per nickel phthalocyanine molecule, in chlorosulphonic acid is obtained in this manner.

The chlorosulphonic acid solution is poured onto ice, the ice-cold suspension is filtered off and the material on the filter is washed with about 400 ml of ice-water, to which 150 ml of 30% strength hydrochloric acid have been added.

(b) The nickel phthalocyanine-(sulphonic acid chloride)-sulphonic acid paste is suspended in ice-water and the suspension is neutralised with sodium hydroxide solution. 16.3 g of 3-aminoformanilide are now added. The temperature is increased to 20°-25° C. in the course of about 1½ hours and the mixture is stirred at this temperature until the reaction has ended. The pH value of the suspension is kept at 6-7 throughout the entire reaction time by adding 14 g of $NaHCO_3$ in portions. The pH value of the suspension is then adjusted to 9.5 to 10 with sodium hydroxide solution and the temperature of the solution is increased to 75° C. in the course of 4 hours, whilst maintaining the pH value.

To saponify the formylamino group, 500 ml of 30% strength hydrochloric acid are allowed to run in, saponification is carried out at 75°-80° C. for 2 hours and the reaction product is filtered off and washed with 1,000 ml of 1.5% strength hydrochloric acid.

(c) 13.6 g of aniline-3-sulphonic acid are suspended in 250 ml of ice-water. The pH value of the suspension is adjusted to 4.0 with sodium hydroxide solution, and 10.7 g of 2,4,6-trifluoro-1,3,5-triazine are added dropwise, whilst stirring thoroughly, the temperature of the solution being kept between 0° and 3° C. and the pH value being kept between 3.0 and 4.0 with the aid of sodium carbonate solution.

Half of the paste of the phthalocyanine derivative obtained by experiment (b) is dissolved, at a pH value of 5 to 6, in 500 ml of water and the solution is cooled to 0° C. A solution of the difluorotriazine derivative obtained in the above paragraph is allowed to run into this solution, the pH value being kept at 5 to 6 with sodium carbonate solution. The temperature of the reaction solution is increased to 25°-30° C. and when the reaction has ended, the dyestuff is salted out with KCl. The dyestuff is filtered off, washed briefly with dilute KCl solution and dried at 50° to 60° C. The dyestuff which, in the form of its free acid, corresponds to the formula

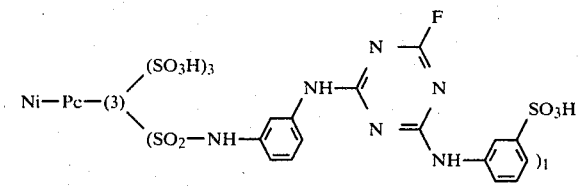

is obtained in virtually quantitative yield. It dyes cotton in green shades with excellent fastness properties.

(d) Half of the paste of the phthalocyanine derivative obtained by experiment (b) is dissolved, at a pH value of 7, in 500 ml of water. 10 g of 5-chloro-2,4,6-trifluoropyrimidine are added dropwise at 18°-22° C. in the course of 5 to 10 minutes, whilst stirring thoroughly, the pH value of the solution being kept between 6.5 and 7.0 with dilute sodium hydroxide solution. Stirring is continued at pH 6.5-7.0 until the reaction has ended and the dyestuff is salted out with NaCl, filtered off, rinsed with dilute sodium chloride solution and dried at 60° C. The dyestuff which, in the form of the free acid, corresponds to the formula

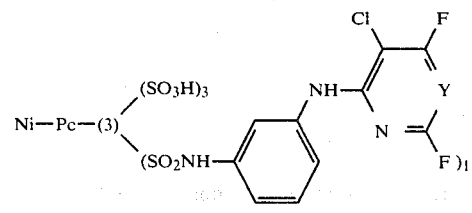

is obtained in virtually quantitative yield. It dyes cotton in green shades with excellent fastness properties.

(e) If the procedure followed is as described under (d), but 10 g of 2,4-difluoro-6-methylamino-1,3,5-triazine are added instead of the 10 g of 5-chloro-2,4,6-trifluoropyrimidine and the reaction is carried out at pH 5.5 to 6.5, the dyestuff which, in the form of its free acid, corresponds to the formula

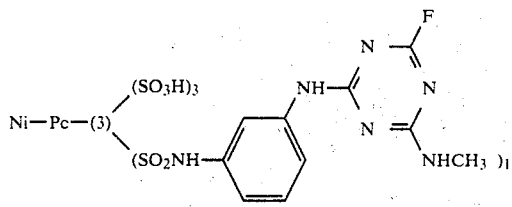

is obtained in virtually quantitative yield. It dyes cotton in green shades with excellent fastness properties.

(f) If the procedure followed is as described under (d), but 10 g of 2,4-difluoro-5-chloro-6-methylpyrimidine are added instead of the 10 g of 5-chloro-2,4,6-trifluoropyrimidine and the reaction is carried out in a pH range of 6.0 to 6.5 and at a temperature of 25°–30° C., the dyestuff which, in the form of its free acid, corresponds to the formula

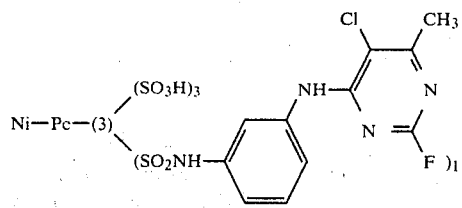

is obtained in very good yield. It dyes cotton in green shades with excellent fastness properties.

EXAMPLE 2

(a) 57.5 g of copper phthalocyanine are stirred into 310 g of chlorosulphonic acid. The temperature is increased to 134° C., the mixture is stirred at 134°–136° C. for 6 hours and cooled to 85° C. and 19 g of thionyl chloride are stirred in at this temperature in the course of ½ hour. Stirring is then continued at 90°–92° C. for a further 4 hours and the melt is cooled to 25°–30° C. A solution of copper phthalocyanine-(sulphonic acid chloride)-sulphonic acid, containing about 1.35 sulphonic acid groups and 2.6 sulphonic acid chloride groups per copper phthalocyanine molecule, in chlorosulphonic acid is obtained in this manner.

The chlorosulphonic acid solution is poured onto ice, the ice-cold suspension is filtered off and the material on the filter is washed with about 4,000 ml of ice-water, to which 150 ml of 30% strength hydrochloric acid have been added.

(b) The copper phthalocyanine-(sulphonic acid chloride)-sulphonic acid paste is suspended in ice-water and the suspension is neutralised with sodium hydroxide solution. 23.4 g of 3-aminophenyloxamic acid are now added. A pH value of 8.0–8.5 is established, and maintained whilst 175 ml of 8% strength sodium hydroxide solution are added dropwise, the temperature of the suspension being increased to 20°–23° C. in the course of one hour. 75 ml of 2N ammonia are then added and the pH is adjusted to 10 with sodium hydroxide solution. Stirring is continued for some hours at 20°–25° C., whilst maintaining this pH value, and the temperature of the solution is then increased slowly to 65° C.

To saponify the oxalylamino group, 500 ml of 30% strength hydrochloric acid are allowed to run in, saponification is carried out at 80° C. for 2 hours and the reaction product is filtered off and washed with 1,000 ml of 1% strength hydrochloric acid.

(c) 13.6 g of aniline-3-sulphonic acid are suspended in 250 ml of ice-water. The pH value of the suspension is adjusted to 4.0 with sodium hydroxide solution, and 10.7 g of 2,4,6-trifluoro-1,3,5-triazine are added dropwise, whilst stirring thoroughly, the temperature of the solution being kept between 0° and 3° C. and the pH value being kept between 3.0 and 4.0 with the aid of sodium carbonate solution.

Half of the paste of the phthalocyanine derivative obtained by experiment (b) is dissolved, at a pH value of 5 to 6, in 500 ml of water and the solution is cooled to 0° C. A solution of the difluorotriazine derivative obtained in the above paragraph is allowed to run into this solution, the pH value being kept at 5 to 6 with sodium carbonate solution. The temperature of the reaction solution is increased to 25° C. and, when the reaction has ended, the dyestuff is salted out. The dyestuff is filtered off, washed briefly with dilute NaCl solution and dried at 50° C. to 60° C. The dyestuff which, in the form of its free acid, corresponds to the formula

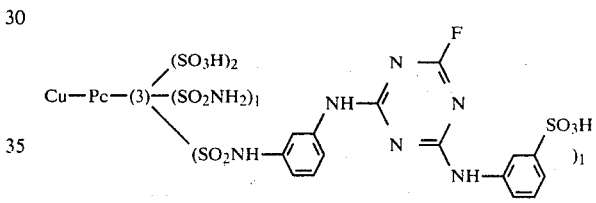

is obtained in very good yield. It dyes cotton in turquoise blue shades with excellent fastness properties.

(d) Half of the paste of the copper phthalocyanine derivative obtained by experiment (b) is dissolved, at a pH value of 7, in 750 ml of water. 10 g of 5-chloro-2,4,6-trifluoropyrimidine are added dropwise at 18°–22° C. in the course of 5 to 10 minutes, whilst stirring thoroughly, the pH value of the solution being kept between 6.5 and 7.0 with dilute sodium hydroxide solution. The mixture is stirred until the reaction has ended and the dyestuff is salted out with NaCl, filtered off, rinsed with dilute sodium chloride solution and dried at 60° C. The dyestuff which, in the form of its free acid, corresponds to the formula

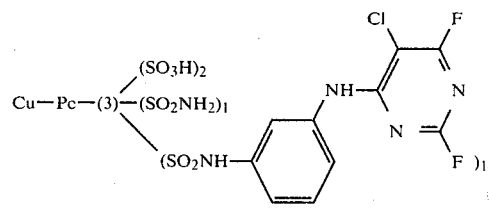

is obtained in very good yield. It dyes cotton in turquoise blue shades with excellent fastness properties.

(e) If the procedure followed is as described under (d), but 10 g of 2,4-difluoro-6-methylamino-1,3,5-triazine are added instead of the 10 g of 5-chloro-2,4,6-trifluoropyrimidine and the reaction is carried out at a pH value of 5.5 to 6.5, the dyestuff which, in the form of its free acid, corresponds to the formula

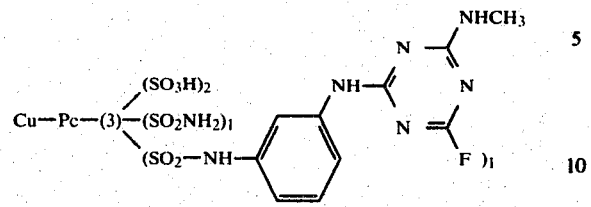

is obtained in very good yield. It dyes cotton in turquoise blue shades with excellent fastness properties.

(f) If the procedure followed is as described under (d), but 10 g of 2,4-difluoro-5-chloro-6-methylpyrimidine are added instead of the 10 g of 5-chloro-2,4,6-trifluoropyrimidine and the reaction is carried out in a pH range of 6.0–6.5 and at a temperature of 25°–30° C., the dyestuff which, in the form of its free acid, corresponds to the formula

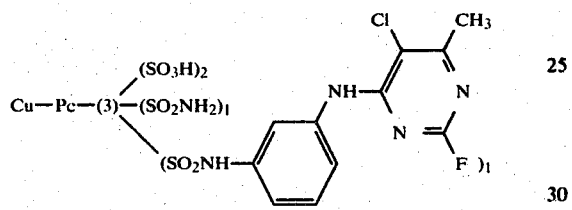

is obtained in very good yield. It dyes cotton in turquoise blue shades with excellent fastness properties.

EXAMPLE 3

(a) 57.5 g of copper phthalocyanine are stirred into 310 g of chlorosulphonic acid. The temperature is increased to 134° C., the mixture is stirred at 134°–136° C. for 6 hours and cooled to 85° C. and 33 g of thionyl chloride are stirred in at this temperature in the course of ½ hour. Stirring is then continued at 90°–92° C. for a further 4 hours and the melt is cooled to 25°–30° C. A solution of copper phthalocyanine-(sulphonic acid chloride)-sulphonic acid, containing about 1.0 sulphonic acid group and 2.9 sulphonic acid chloride groups per copper phthalocyanine molecule, in chlorosulphonic acid is obtained in this manner.

The chlorosulphonic acid solution is poured onto ice, the ice-cold suspension is filtered off and the material on the filter is washed with about 4,000 ml of ice-water, to which 150 ml of 30% strength hydrochloric acid have been added.

(b) The copper phthalocyanine-(sulphonic acid chloride)-sulphonic acid paste is suspended in ice-water and the suspension is neutralised with sodium hydroxide solution. 16.3 g of 4-aminoformanilide are now added. To react the amine, the pH value of the reaction mixture is kept between 6 and 7 for some hours by gradually adding 15 g of NaHCO₃, the temperature being increased to 20°–25° C. 75 ml of 2N ammonia are then added and the pH is adjusted to 10 with sodium hydroxide solution. Stirring is continued at 20°–25° C. for some hours, whilst maintaining this pH value, and the temperature of the solution is then increased slowly to 60°–65° C.

To saponify the formamino group, 500 ml of 30% strength hydrochloric acid are run in, saponification is carried out at 80° C. for 2 hours and the reaction product is filtered off and washed with 1,000 ml of 1% strength hydrochloric acid.

(c) 13.6 g of aniline-3-sulphonic acid are suspended in 250 ml of ice-water. The pH value of the suspension is adjusted to 4.0 with sodium hydroxide solution, and 10.7 g of 2,4,6-trifluoro-1,3,5-triazine are added dropwise, whilst stirring thoroughly, the temperature of the solution being kept between 0° and 3° C. and the pH value being kept between 3.0 and 4.0 with the aid of sodium carbonate solution.

Half of the paste of the phthalocyanine derivative obtained by experiment (b) is dissolved, at a pH value of 5 to 6, in 500 ml of water and the solution is cooled to 0° C. A solution of the difluorotriazine derivative obtained in the above paragraph is allowed to run into this solution, the pH value being kept at 5 to 6 with sodium carbonate solution. The temperature of the reaction solution is increased to 25° C. and, when the reaction has ended, the dyestuff is salted out. The dyestuff is filtered off, washed briefly with dilute NaCl solution and dried at 50° to 60° C. The dyestuff which, in the form of its free acid, corresponds to the formula

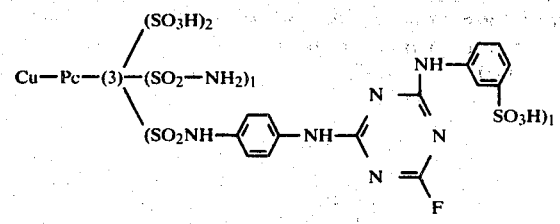

is obtained in virtually quantitative yield. It dyes cotton in turquoise shades with excellent fastness properties.

(d) Half of the paste of the copper phthalocyanine derivative obtained by experiment (b) is dissolved, at a pH value of 7, in 750 ml of water. 10 g of 5-chloro-2,4,6-trifluoropyrimidine are added dropwise at 18°–22° C. in the course of 5 to 10 minutes, whilst stirring thoroughly, the pH value of the solution being kept between 6.5 and 7.0 with dilute sodium hydroxide solution. The mixture is stirred until the reaction has ended and the dyestuff is salted out with NaCl, filtered off, rinsed with dilute sodium chloride solution and dried at 60° C. The dyestuff which, in the form of its free acid, corresponds to the formula

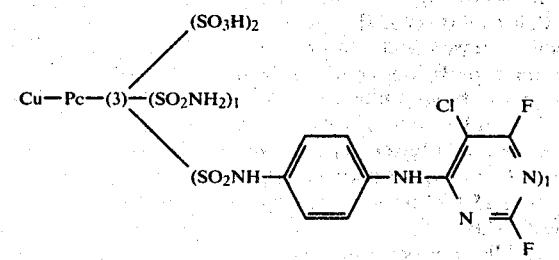

is obtained in very good yield. It dyes cotton in turquoise shades with excellent fastness properties.

(e) If the procedure followed is as described under (d), but 10 g of 2,4-difluoro-6-methylamino-1,3,5-triazine are added instead of the 10 g of 5-chloro-2,4,6-trifluoropyrimidine and the reaction is carried out at a pH value of 5.5 to 6.5, the dyestuff which, in the form of its free acid, corresponds to the formula

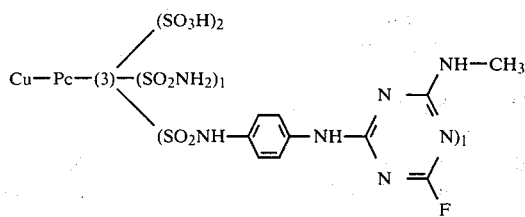

is obtained in very good yield. It dyes cotton in turquoise shades with excellent fastness properties.

DYEING EXAMPLE 1

220 ml of water of 20°–25° C. are initially introduced into a dyeing beaker which has a capacity of 550 ml and is in a water bath which can be heated. 0.3 g of the dyestuff obtained according to Example 1 d is mixed thoroughly with 2 ml of cold water to form a paste and 48 ml of hot water (70° C.) are added. The dyestuff solution, which has a pH value of 7–8, is added to the initially introduced water, 10 g of cotton yarn being kept continuously in motion in this dye liquor. The temperature of the dye liquor is increased to 60° C. in the course of 10 minutes, 15 g of anhydrous sodium sulphate are added and dyeing is continued for 30 minutes. 2 g of sodium carbonate are then added to the dye liquor and dyeing is carried out at 60° C. for 60 minutes. The dyed material is then taken out of the dye liquor, the adhering liquor is removed by wringing out or pressing off and the material is rinsed thoroughly, first with cold water and then with hot water, until the rinsing liquor is no longer stained. The dyed material is then soaped at the boiling point for 20 minutes in 500 ml of a liquor which contains 0.5 g of sodium alkylsulphonate, rinsed again and dried at 60°–70° C. in a drying cabinet. The cotton is dyed in a clear, bluish-tinged green shade which is fast to wet processing.

DYEING EXAMPLE 2

3 g of the dyestuff obtained according to Example 2 c are stirred with 5 g of urea and 1 g of sodium m-nitrobenzene-sulphonate, the mixture is mixed thoroughly with 10 ml of water of 20°–25° C. to form a paste and a solution is formed, at pH 7–8, by stirring with 80 ml of water of 20° C. 20 ml of a 10% strength sodium carbonate solution are added to this solution. 20 g of cotton fabric are padded with the resulting padding liquor on a laboratory padder, the rollers of which are pressed together with a pressure such that the liquor pick-up of the cotton fabric is about 80% of its dry weight. The fabric thus padded is fixed on a stenter, dried at 60°–70° C. in a drying cabinet for 15 minutes and then steamed at 102° C. for 3 minutes. The dyed material is then rinsed thoroughly, first with cold water and then with hot water, until the rinsing liquor is no longer stained. The dyed material is then soaped at the boil for 20 minutes in 500 ml of a liquor which contains 0.5 g of a sodium alkyl-sulphonate, rinsed again and dried at 60°–70° C. in a drying cabinet.

The dyestuff is absorbed in a clear, turquoise blue shade which is fast to wet processing.

DYEING EXAMPLE 3

20 g of wool hanks are introduced, at 40° C., into a dyebath which consists of 0.5 g of the dyestuff obtained according to Example 2 c (dissolved at pH 7–8), 3.0 g of a polyglycol ether prepared according to German Auslegeschrift No. 1,041,003, Example 9, 5.0 g of sodium sulphate and 1.2 g of 30% strength acetic acid per liter and are warmed to 80° C. in the course of 15 minutes. The bath is left at this temperature for 30 minutes and then warmed to the boiling point and this temperature is maintained for about one hour. After rinsing the hanks with water, a turquoise blue dyeing which is fast to potting and milling is obtained.

PRINTING EXAMPLE

A piece of cotton is printed with a printing paste consisting of 50 g of the dyestuff of Example 2 d, 150 g of urea, 20 g of sodium bicarbonate, 10 g of sodium m-nitrobenzene-sulphonate, 450 g of a highly viscous alginate thickener and 320 g of water and is steamed at 103° C. in a steamer, for example of the Mather-Platt type. The print is then rinsed with cold water, then with hot water and finally with cold water again. A turquoise blue print which is fast to wet processing is obtained.

I claim:

1. Process for the preparation of phthalocyanine reactive dyestuffs of the formula

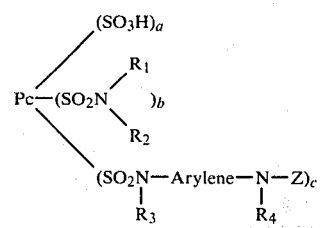

wherein
Pc denotes the radical of a copper phthalocyanine or nickel phthalocyanine,
$R_1$ and $R_2$ denote hydrogen or optionally substituted alkyl,
$R_3$ and $R_4$ denote hydrogen or optionally substituted alkyl,
Arylene denotes a single-membered or multi-membered, optionally halogen or $C_1$ to $C_4$-alkyl group substituted arylene radical which can optionally be interrupted by an oxygen atom or an imino, carbonyl, carboxamide, urea, sulphonyl or sulphonamide group,
Z denotes

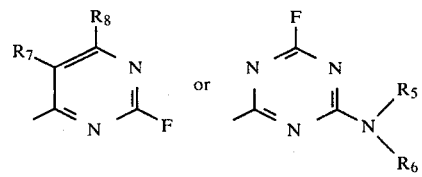

wherein
$R_5$ and $R_6$ denote hydrogen, optionally substituted alkyl, optionally substituted aralkyl or optionally substituted aryl,
$R_7$ denotes H or Cl and
$R_8$ denotes H, F or $CH_3$ and
a denotes a number from 1 to 3,
b denotes a number from 0 to 2,
c denotes a number from 1 to 2 and
$a+b+c \leq 4$, characterised in that phthalocyanine-(sulphonic acid chloride)-sulphonic acids of the formula

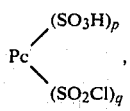

wherein
p denotes a number from 0.5 to 1.8,
q denotes a number from 1.2 to 3.5 and
p+q=2 to 4,
are reacted with c mols of a monoacylated arylenediamine of the formula

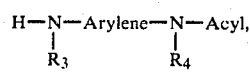

wherein
$R_3$, $R_4$ and arylene have the abovementioned meaning and
acyl represents an acyl group,
and, if appropriate, b mols of an amine of the formula

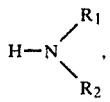

wherein $R_1$ and $R_2$ have the abovementioned meaning, the acylamino group is saponified and the resulting aminophthalocyanine dyestuffs are reacted with c mols of a compound of the formula

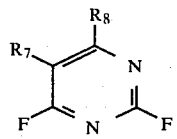

or with c mols of a compound of the formula

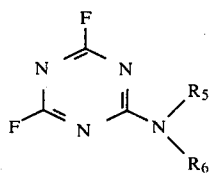

wherein $R_5$–$R_8$ have the abovementioned meaning.

2. Process for the preparation of phthalocyanine reactive dyestuffs of the formula

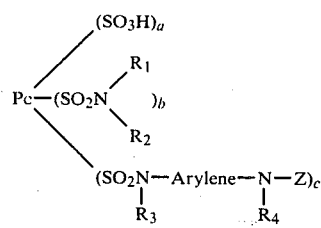

wherein

Pc denotes the radical of a copper phthalocyanine or nickel phthalocyanine,
$R_1$ and $R_2$ denote hydrogen or optionally substituted alkyl,
$R_3$ and $R_4$ denote hydrogen or optionally substituted alkyl,
arylene denotes a phenylene radical which is optionally substituted by halogen atoms or $C_1$ to $C_4$-alkyl groups,
Z denotes

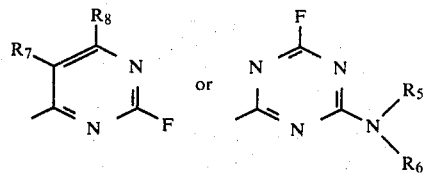

wherein
$R_5$ and $R_6$ denote hydrogen, optionally substituted aralkyl, optionally substituted aryl or optionally substituted alkyl,
$R_7$ denotes H or Cl and
$R_8$ denotes H, F or $CH_3$,
a denotes a number from 1 to 3,
b denotes a number from 0 to 2,
c denotes a number from 1 to 2 and
a+b+c≦4,
characterised in that phthalocyanine-(sulphonic acid chloride)-sulphonic acids of the formula

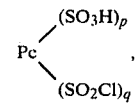

wherein
p denotes a number from 0.5 to 1.8,
q denotes a number from 1.2 to 3.5 and
p+q=2 to 4,
are reacted with c mols of a monoacylated arylenediamine of the formula

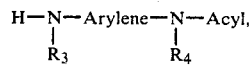

wherein
$R_3$, $R_4$ and arylene have the abovementioned meaning and
acyl represents an acyl group,
and, if appropriate, b mols of an amine of the formula

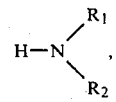

wherein $R_1$ and $R_2$ have the abovementioned meaning, the acylamino group is saponified and the resulting aminophthalocyanine dyestuffs are reacted with c mols of a compound of the formula

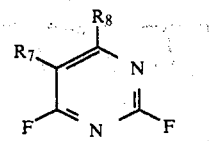

or with c mols of a compound of the formula

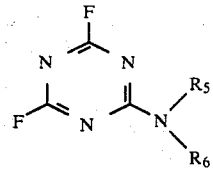

wherein $R_5$–$R_8$ have the abovementioned meaning.

3. Process for the preparation of phthalocyanine reactive dyestuffs of the formula

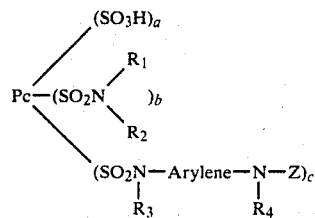

wherein
- Pc denotes the radical of a copper phthalocyanine,
- $R_1$ and $R_2$ denote hydrogen, methyl or ethyl,
- $R_3$ and $R_4$ denote hydrogen, methyl or ethyl,
- arylene denotes a phenylene radical which is optionally substituted by halogen atoms or methyl or ethyl groups,
- Z denotes

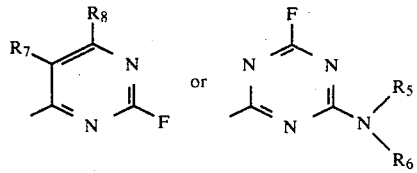

wherein
- $R_5$ and $R_6$ denote hydrogen, optionally substituted aralkyl, optionally substituted aryl or optionally substituted alkyl,
- $R_7$ denotes H or Cl and
- $R_8$ denotes H, F or $CH_3$,
- $2 \leq a < 3$,
- $0 < b \leq 1$,
- c denotes 1 and
- $a+b+c = 3$ to 4, characterised in that phthalocyanine-(sulphonic acid chloride)-sulphonic acids of the formula

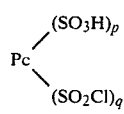

wherein

- p denotes a number from 0.5 to 1.8,
- q denotes a number from 1.2 to 3.5 and
- p+q = 2 to 4, are reacted with c mols of a monoacylated arylenediamine of the formula

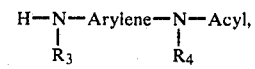

wherein
- $R_3$, $R_4$ and arylene have the abovementioned meaning and
- acyl represents an acyl group, and, if appropriate, b mols of an amine of the formula

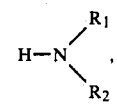

wherein $R_1$ and $R_2$ have the abovementioned meaning, the acylamino group is saponified and the resulting aminophthalocyanine dyestuffs are reacted with c mols of a compound of the formula

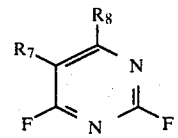

or with c mols of a compound of the formula

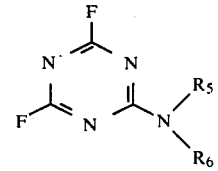

wherein $R_5$–$R_8$ have the abovementioned meaning.

4. Process for the preparation of phthalocyanine reactive dyestuffs of the formula

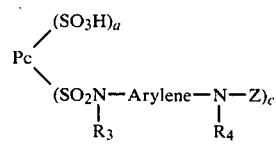

wherein
- Pc denotes the radical of a nickel phthalocyanine,
- $R_3$ and $R_4$ denote hydrogen, methyl or ethyl,
- arylene denotes a phenylene radical which is optionally substituted by halogen atoms or methyl or ethyl groups,
- Z denotes

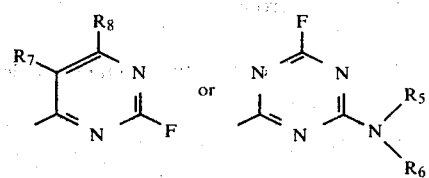

wherein $R_5$ and $R_6$ denote hydrogen, optionally substituted alkyl, optionally substituted aralkyl or optionally substituted aryl, $R_7$ denotes H or Cl and $R_8$ denotes H, F or $CH_3$, a denotes a number from 2 to 3, c denotes 1 and $a+c=3$ to 4, characterised in that phthalocyanine-(sulphonic acid chloride)-sulphonic acids of the formula

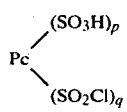

wherein p denotes a number from 0.5 to 1.8, q denotes a number from 1.2 to 3.5 and $p+q=3$ to 4, are reacted with c mols of a monoacylated arylenediamine of the formula

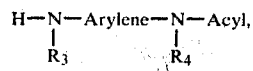

wherein $R_3$, $R_4$ and arylene have the abovementioned meaning and acyl represents an acyl group, the acylamino group is saponified and the resulting aminophthalocyanine dyestuffs are reacted with c mols of a compound of the formula

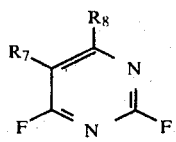

or with c mols of a compound of the formula

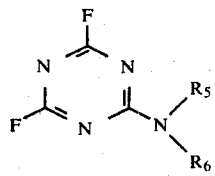

wherein $R_5$–$R_8$ have the abovementioned meaning.

5. The process of claim 1 wherein p denotes a number from 0.8 to 1.4 or, if $b=0$, 1.0 to 1.6.

6. The process of claim 2 wherein p denotes a number from 0.8 to 1.4 or, if $b=0$, 1.0 to 1.6.

7. The process of claim 3 wherein p denotes a number from 0.8 to 1.4.

8. The process of claim 4 wherein p denotes 1.0 to 1.6.

* * * * *